United States Patent [19]

D'Andrea et al.

[11] Patent Number: 4,489,629
[45] Date of Patent: Dec. 25, 1984

[54] BORING AND FACING HEAD AS WELL AS A MACHINE DESIGNED FOR RECEIVING THIS HEAD

[75] Inventors: Nicola D'Andrea; Ermanno D'Andrea, both of Saronno; Castellini Adriano, Milan; Medea Ferdinando, Saronno, all of Italy

[73] Assignee: D'Andrea S.p.A., Italy

[21] Appl. No.: 330,724

[22] Filed: Dec. 14, 1981

[30] Foreign Application Priority Data

Dec. 23, 1980 [IT] Italy .............................. 26892 A/80

[51] Int. Cl.³ ............................................ B23B 29/03
[52] U.S. Cl. ........................................ 82/1.2; 29/568
[58] Field of Search ................ 82/1.2, 1.4, 2 A, 2 C, 82/2 E; 29/568; 318/626

[56] References Cited

U.S. PATENT DOCUMENTS 3,714,537 1/1973 Bur ...................................... 318/626
4,019,246 4/1977 Tomita et al. ........................ 29/568

FOREIGN PATENT DOCUMENTS 106702 8/1980 Japan ..................................... 82/1.2
599930 3/1978 U.S.S.R. ............................... 82/1.2

Primary Examiner—Lowell A. Larson
Attorney, Agent, or Firm—Roylance, Abrams, Berdo & Goodman

[57] ABSTRACT

A boring and facing head for use in a machine tool comprising a body for insertion into a spindle on the machine tool, a tool, a slide mechanism for supporting the tool for movement transversely of the body, a series of shafts and gears for actuating the slide, and a coupling tongue located at the end of one of these shafts and slidably engageable with a rotary device supported by the machine tool whose rotary movement is precision-controlled by a numerical control unit.

16 Claims, 4 Drawing Figures

BORING AND FACING HEAD AS WELL AS A MACHINE DESIGNED FOR RECEIVING THIS HEAD

SUMMARY OF THE INVENTION

A boring and facing head, whose mechanism for the radial displacement of the tool is provided with a coupling joint operatingly connected with a rotation device whose rotary movement is precision-controlled by a numerical control unit and by the side of the machine receiving the tool holder spindle, the side from which projects a rotation sleeve which can be coupled to the end of the coupling joint for the radial displacement of the tool, the said sleeve receiving a rotary movement controlled by numerical control means.

DESCRIPTION OF THE INVENTION

This invention relates to a boring and facing head as well as to a machine tool designed for receiving the head.

It is known that the conventional boring and milling machines can be fitted with known boring and facing heads, with these heads, being fitted with suitable tools, being usable for boring, facing, thread-cutting and other similar works.

The said boring heads are equipped with a knob complete with vernier, this knob allowing displacement of the tool with respect to the axis of rotation of the taper or spindle of the machine tool.

For this reason, these boring and facing heads need the manual intervention of the operator for any adjustment of the tool in radial direction.

There is known also a type of boring and facing head carrying at the inside of its body a direct-current motor piloted by known numerical control devices, for the automatic and preset radial displacement of the tool with respect to the axis of rotation of the machine tool spindle.

A drawback of this known, electronically piloted boring and facing head is its rather cumbersome overall dimension, its heavy weight and the necessity of having to provide connecting cables and to maintain the electric supply and control cables always in connection with the direct current motor and respective auxiliary devices.

In these last years, the market offered an always growing number of machining centres designed for carrying out a plurality of cutting operations on the piece. These centres use numerous tools adapted to the single specific working operations, the said tools being contained in a disk or chain magazine and automatically picked up therefrom for being inserted into the spindle of the machine tool for the completion of the desired mechanical cutting of the workpiece. After completion of the work, the tool is again automatically gripped by the machine tool spindle for being replaced by a different tool again removed from the tool magazine.

It was until now impossible to insert boring and facing heads into these tool holder magazines interlinked with mechanical working groups or the so-called machine centres, given the weight and dimension of the known types already mentioned hereinabove and requiring a manual radial adjustment and displacement of the tool with respect to the boring head, with the impossibility of using them for machining centres where the positioning of the tool with respect to the workpiece is normally provided by numerical control devices and means.

Also the second of the above-mentioned embodiments of boring and facing heads are not adapted for mechanical machine centres equipped with interchangeable tool magazines, because the said numerical control boring and facing heads are not only too cumbersome and too heavy and without a conventional coupling taper as required for the machine tool spindle, but also because the said heads need electric cables for supplying the direct current motor and others for the transmission of signals deriving, for example, from a numerical control unit. Obviously, the presence of such wires does not allow the use of such a head in a magazine designed for interchangeable tools.

For this reason, despite the advantages offered by the use of boring heads, the working groups and socalled machine centres use still today traditional tools of a specific conformation and shape for each single working phase, for example, angular, surface and face milling. Very often it will be necessary to replace, for facing operations, both the workpiece table and also the tool holder head which, not only liable to cause a high machine guide wear, may also result in the deterioration of the required precision and tolerance of planing and facing operations. The known tools, when used with machine centres of the conventional type, often do not allow carrying out of undercutting, thread-cutting, tapered borings, convex and/or other kinds of boring operations.

This invention proposes to obviate the drawbacks inherent to the preceding state of the art with the help of a new boring and face cutting head which can be fitted to a machining centre provided with a magazine containing interchangeable tools and allowing the registration, adjustment and movement of the tool with numerical-control means, without the boring and facing head requiring the manual intervention of the operator or electrical cables for the supply of current and control signals.

A further object of this invention is a machine tool for receiving the head according to the invention. This object is attained according to the invention by the mechanism for the radial displacement of the tool comprising a clutch joint operatively connected with a rotary device whose rotary movement is precision controlled by a numerical control unit and by the side of the machine receiving the tool holder spindle being provided with a rotary sleeve which can be connected with the end of the clutch joint for the radial displacement of the tool, with the said sleeve receiving the rotary motion piloted by numerical control means.

Further characteristics of this invention can be taken from the following description, claims and accompanying drawings.

The device according to this invention shall now be described more in detail on hand of an embodiment given by way of example and illustrated in the accompanying drawings, in which:

FIG. 1 schematically shows the boring and facing head according to this invention as a cross-section along the line I—I of FIG. 2;

Figure 1:
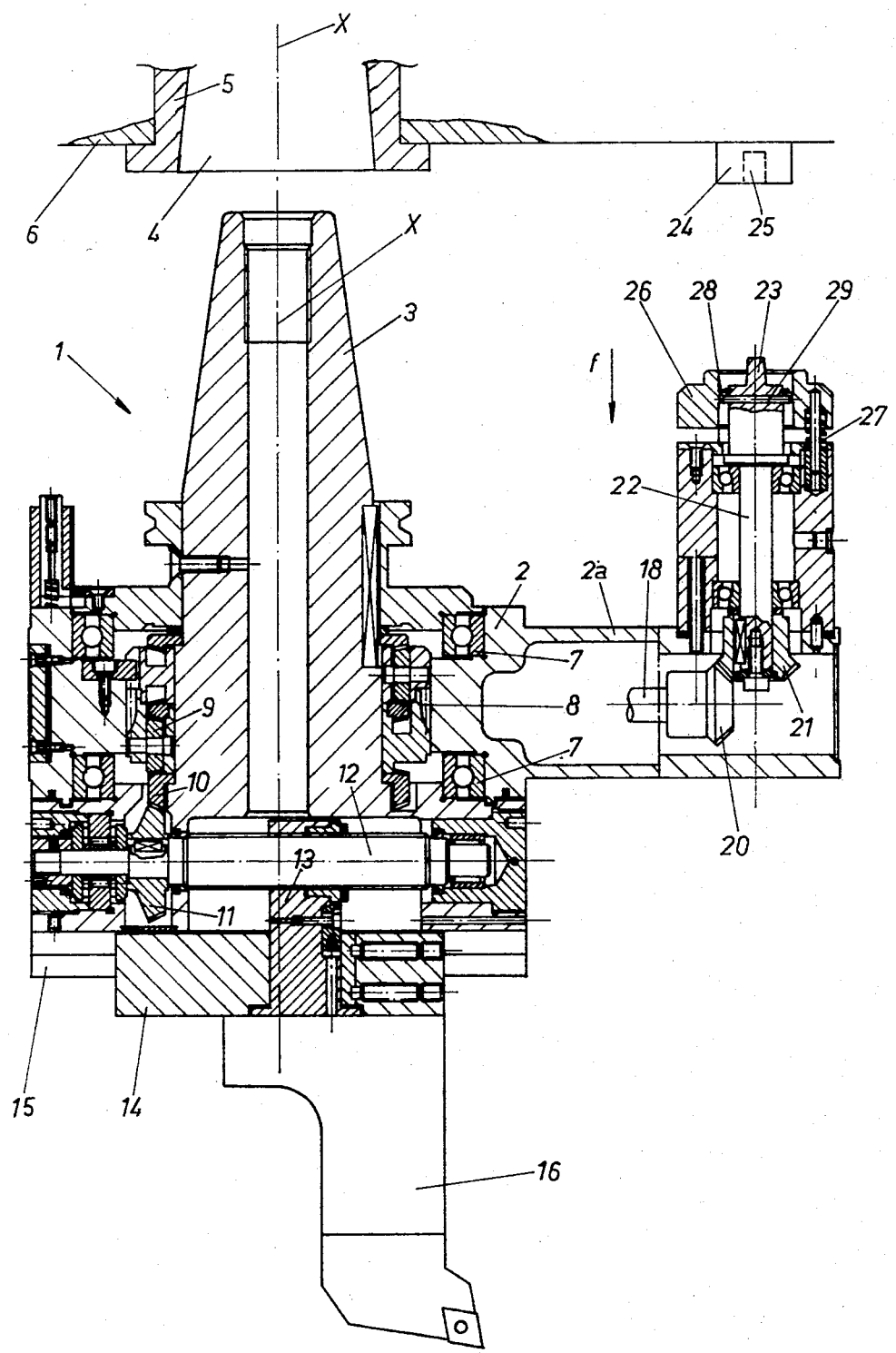

As it is shown in FIG. 1, the boring and facing head indicated as such by 1, consists of a body 2 with a known taper 3 projecting therefrom, insertable into the hole 4 of a spindle 5 of a machine tool 6. The taper 3 is supported in known manner by a bearing 7 in the body 2. Inside the body 2 is provided in addition a crown wheel 8 around the taper 3. The crown wheel 8 is operatively connected with a toothed wheel 9 which, through a further crown wheel 10, engages a tapered pinion 11 which is an integral part of a threaded shaft 12 which, through a lead screw 13, engages a slide 14. This slide 14 can be radially, i.e. transversely displaced with respect to the X axis of the taper 3 along a dovetailed guide 15 on the lower side of the boring and facing head 1. This slide 14 carries the tool 16. It must here be stated that the mechanical parts from 7 to 16 are known to the preceding state of the art and therefore not further described hereinafter. A lateral extension 2a of the body 2 houses, on bearings 17 (see FIG. 2), a horizontal, rotating shaft 18 which, at its end turned toward the crown wheel 8, has a worm screw 19 engaging with the gearing of the said crown wheel 8. At the other end of the shaft 18, that is opposite to worm screw 19, is provided a tapered gear wheel 20, engaging another tapered gear wheel 21 which is an integral part of a vertical shaft 22 ending in a precise coupling tongue 23 projecting from the free end of the vertical shaft 22.

When positioning the taper 3 with its axis X at the axis X of the hole 4 of spindle 5 of the machine tool 6, the coupling tongue 23 faces a rotary sleeve 24 with a recess 25 apt to receive geometrically the tongue 23 of the drive shaft 22. At the top the shaft 22 is surrounded by a locking ring 26, axially displaceable with respect to the shaft 22 and against the effect of a spring device 27. The locking ring presents at the inside projecting and diametrically opposed projections 28 engaging a cross pin 29 seated in the upper end of the shaft 22. With the device as described hereinbefore in disengaged position, the coupling tongue 23 remains always oriented toward the corresponding extension of the recess 25 of sleeve 24 projecting from the machine tool 6. The shaft 22 is thereby prevented from receiving either by chance or faulty operation a rotary motion when in the rest position which might prevent, thereafter the automatic coupling between the tongue 23 and recess 25 when inserting the taper 3 into the spindle 5.

The positioning and locking means of the tongue 23, shown in FIG. 1 by 26, 27, 28 and 29, are disengaged when the taper 3 is introduced into the hole 4 and the sleeve 26 pushed, when in contact with the front side of the machine tool 6, in a direction indicated by the arrow f, so that, when in this position, the transverse pin 29 becomes disengaged from the radial projections 28, allowing thus the free and unhindered rotation of the shaft 22. It is easy to understand that, with the rotation of the shaft 22 and that of shaft 18 driven by the crown wheel 8, the gear wheel 9, crown wheel 10 and pinion 11, it is possible to confer a rotary motion to the threaded shaft 12 thus displacing, through the worm 13 and slide 14, the tool 16 along the dovetailed guide 15.

Figure 2:
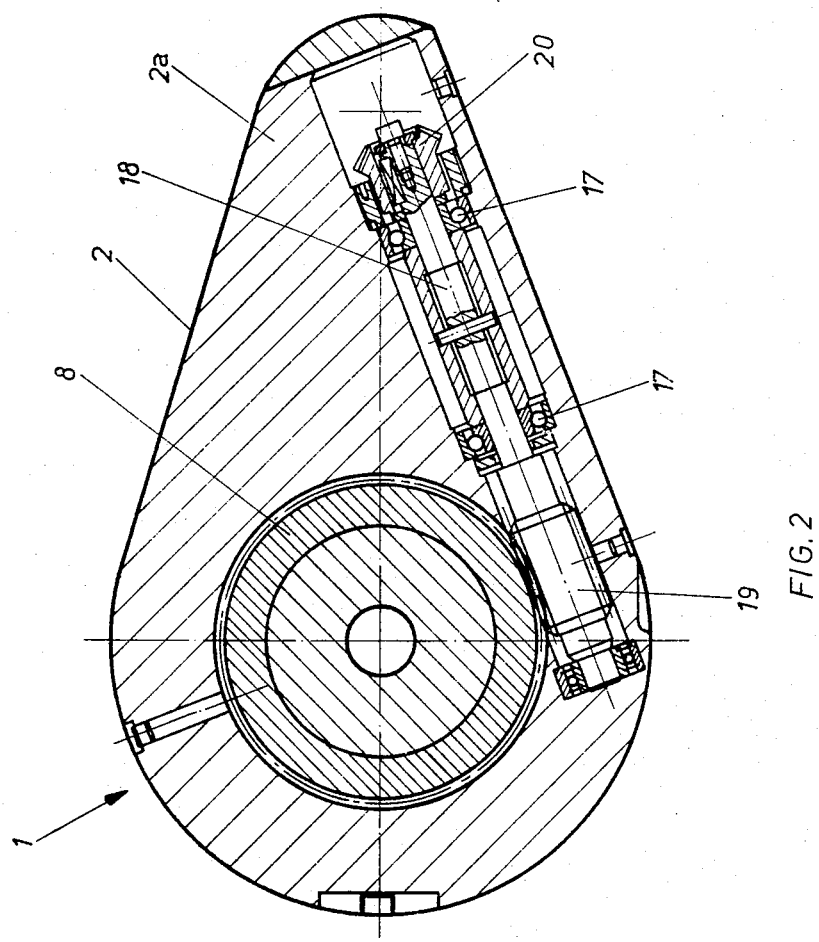
FIG. 2 is a part plan view and part section of the boring and facing head along the line II—II of FIG. 1.

While in FIG. 1 the motion is transmitted to the shaft 22 directly through a sleeve 24 driven by the machine tool 6, a further embodiment proposes the extension of the shaft 18 renouncing at the same time on the tapered gears 20, 21, that is confering the rotary motion directly to the shaft 18 which, in this case, should be provided at its free end with a coupling tongue similar to the tongue 23. The motion could be imparted to the shaft 18 by means of a rotating spindle part of an industrial robot whose rotary motion would be controlled in turn by the numerical control device. FIG. 2 shows that the boring and facing head has the shaft 18 inclined with respect to the longitudinal axis of the head 1. This results in a particularly compact, pear-like shape of the boring and facing head body becoming thus easy to handle and allowing the easy placing and positioning in the tool magazine without being troubled by excessive size.

Figure 3:
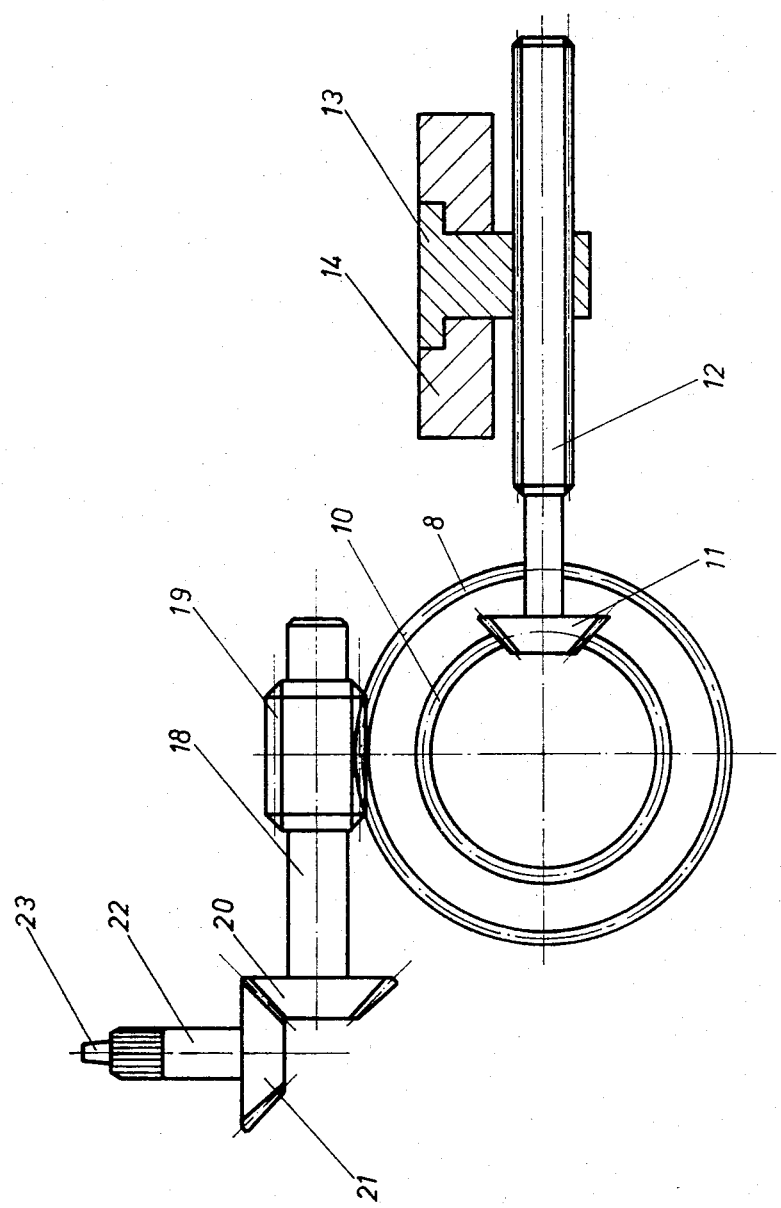
FIG. 3 is a diagram of the radial displacement mechanism of the boring and facing head tool.

FIG. 3 substantially shows the kinematic chain of the boring and facing head according to this invention. It is easy to observe the coupling tongue 23 projecting from the free end of the shaft 22 which, through the tapered gear wheel 21, is operatively connected with the tapered gear wheel 20 of the driving shaft 18, engaging, through worm screw 19, the threading of the crown wheel 8 connected in turn through the gear wheel 9 (not shown in FIG. 3) with a further crown wheel 10 engaging a tapered pinion 11, which is an integral part of the threaded shaft 12 of the lead screw 13 of the tool slide 14.

Figure 4:
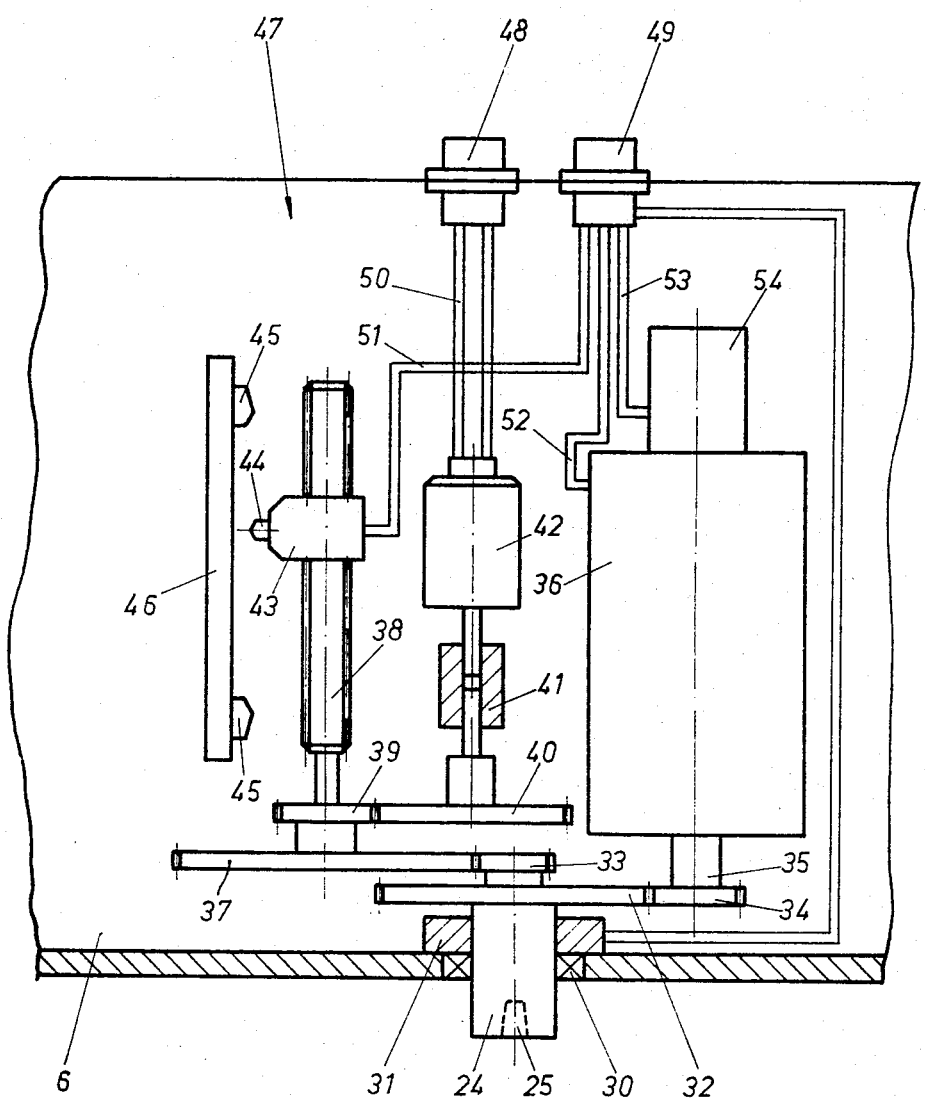
FIG. 4 schematically shows the electric and electronic means and mechanism for making and controlling the adjusting and control movements of the boring and facing head tool.

FIG. 4 shows schematically the means required for imparting to the sleeve 24 projecting from the front side of the machine tool 6, the necessary controlled rotary motion. The sleeve 24 is supported, favourably, in a rotary manner by the provision of a bearing 30, on the front side of the machine tool 6, that is immediately near and with the axis parallel to the X axis of the tool holder spindle 5 designed for receiving the taper 3. To make it possible to lock the sleeve 24 always in the desired position, that is with the coupling recess 25 in alignment with the position tongue 23 of the shaft 22, the sleeve 24 is advantageously interlinked with an electromagnetic brake 31 or similar controllable means. At the end of the sleeve 24, opposite to the coupling recess 25, is provided a first gear wheel 32 and a second gear wheel 33. The gear wheel 32 is engaged with a gear wheel 34 which is an integral part of the shaft 35 of a direct-current motor 36. The gear wheel 33 of the sleeve 24 results to be operationally connected with a gear wheel 37, which is an integral part of a threaded rod 38. In addition, the threaded rod 38 is an integral part with a further gear wheel 39 engaging with a gear wheel 40 connected with the interposition of a clutch 41 to a resolver, encoder 42 or different type of transducer, devices normally used in the field of numerical control.

On the threaded rod 38 slides a lead nut 43 threaded at the inside, with a stem 44 projecting therefrom for operating an electric switch. This stem 44 can be activated by end of stroke cams 45, adjustably provided on a supporting bracket 46. The parts 31–46 are preferably housed in an assembling body indicated as such by 47. The whole body 47 can be positioned for example inside the spindle holder head of the machine tool 6. The said body 47 is equipped with connectors 48 and 49. The connector 48 is connected with the electric cables 50 and the resolver or encoder input 42, while the connector 49 received the cables 51 coming from the end-of-stroke switch 44, the cables 52 for the current supply to the motor 36, as well as the cables 53 coming from a tachometer dynamo 54, which is an integral part of the direct-current motor 36. The connectors 48 and 49 are also connected with the numerical control unit for the supply of the current as well as for receiving and transmitting the piloting and control signals.

The operation of the head 1 according to this invention is as follows:

The head 1 is picked up by known mechanisms from the tool magazine (not shown) to be inserted with its taper 3 into the hole 4 of the spindle 5. Using known means, the taper is automatically locked in the machine tool 6 and, during the insertion of the taper 3 into the hole 4 of the spindle 5, the tongue 23 engages the recess 25 of the driving sleeve projecting from the machine tool 6. It must be kept in mind that the head tool 16 is adjusted or preset outside of the machine tool and, when inserted in the machine, has its cutting edge at a preset reference point. To displace the tool 16, a radial movement is imparted to the slide 14 along the dovetailed guide 15. This movement is ensured by the threaded shaft 12, pinion 11, crown wheel 10, gear wheel 9 and crown wheel 8 engaging the worm screw 19 of the shaft 18 which, through a pair of tapered gear wheels 20, 21, is connected by the tongue 23 with the recess 25 of the sleeve 24.

As shown in FIG. 4, the rotating sleeve 24 is driven by the gear wheels 32, 34, driven in turn by the direct-current motor 36. The tachometer dynamo 54 allows ascertaining the revolutions of the motor and the ensuing adjustment with the numerical control unit.

The resolver or encoder 42 allows checking, at any moment, the exact position of the tool with respect to the reference point determined in the presetting phase. For safety reasons, the threaded rod 38 is provided with a lead nut 43 which can be displaced in axial direction and being provided with a pushbutton 44 part of an electric switch and, the said pushbutton 44 being engaged by a presettable end-of-stroke element 45, it is therefore possible to determine the maximum stroke of the lead nut 43 and therewith of the tool 16. Two connectors 48, 49 functionally connect the driving and control means 36, 54, 42, 43, 44 one to the other and also to the numerical control unit elaborating the signals received from the tachometer dyanmo 54 and resolver or encoder 42 and also from the switch 44, controlling thus the direct current motor 36 for moving, positioning and driving the tool 16 according to preset programmes.

What we claim is:

1. A boring and facing head for use in a machine tool, the combination comprising:
   a body adapted to be inserted into a spindle on the machine tool;
   a tool;
   first means, coupled to said body and said tool, for supporting said tool for movement transversely of said body; and
   second means, coupled to said first means and slidably engageable with a rotation device supported by the machine tool whose rotary movement is precision-controlled by a numerical control unit, for moving said tool transversely of said body in a precision-controlled manner,
   said second means being laterally spaced from said body.

2. A head according to claim 1, wherein said second means includes a coupling tongue having a longitudinal axis parallel to the longitudinal axis of said body.

3. A head according to claim 1, wherein said second means comprises
   a coupling tongue slidably engaging the rotation device supported by the machine tool, and
   a rotational drive transmitting member coupled to said coupling tongue and to said first means.

4. A head according to claim 1, wherein said second means comprises
   a coupling tongue for slidable engagement with a rotatable sleeve coupled to the rotation device.

5. A boring and facing head for use in a machine tool, the combination comprising:
   a body adapted to be inserted into a spindle on the machine tool;
   a tool;
   first means, coupled to said body and said tool, for supporting said tool for movement transversely of said body; and
   second means, coupled to said first means and slidably engageable with a rotation device supported by the machine tool whose rotary movement is precision-controlled by a numerical control unit, for moving said tool transversely of said body in a precision-controlled manner,
   said body including a lateral extension and a second extension extending perpendicularly from said lateral extension, and
   said second means including a rotatable shaft housed in said lateral extension, a tapered gear wheel coupled to said shaft, a second tapered gear wheel coupled to said tapered gear wheel, and a second rotatable shaft housed in said second extension and coupled to said second tapered gear wheel.

6. A head according to claim 5, wherein
   said second rotatable shaft has a coupling tongue at the end for engaging the rotation device supported by the machine tool.

7. A head according to claim 6, wherein
   said coupling tongue has a geometrical configuration allowing slidable engagement with the rotation device supported by the machine tool which has a recess of a corresponding geometrical configuration.

8. A head according to claim 6, and further comprising
   means, coupled to said body and said coupling tongue, for releasably locking said tongue against rotation.

9. A boring and facing head for use in a machine tool, the combination comprising:
   a body adapted to be inserted into a spindle on the machine tool;
   a tool;
   first means, coupled to said body and said tool, for supporting said tool for movement transversely of said body; and
   second means, coupled to said first means and slidably engageable with a rotation device supported by the machine tool whose rotary movement is precision-controlled by a numerical control unit, for moving said tool transversely of said body in a precision-controlled manner,
   said second means including a rotatable shaft oriented at an acute angle to the longitudinal axis of said body.

10. A machine tool for the reception of a boring and facing head in an exposed surface thereof, the combination comprising:

an open-ended spindle supported on the exposed surface for the slidable reception of the body of the boring and facing head;

a rotary device, coupled to the exposed surface in a position spaced from said open-ended spindle, for transmitting rotary movement to the body of the boring and facing head and for slidably receiving a coupling tongue carried by the body; and means, coupled to said rotary device, for rotating said rotary device, said means being precision-controlled by a numerical control unit.

11. A machine tool according to claim 10, wherein
said open-ended spindle has a longitudinal axis, and
said rotary device has a longitudinal axis, these axes being substantially parallel.

12. A machine tool according to claim 10, and further comprising
a direct-current motor coupled to said rotary device, and
a resolver means coupled to said rotary device,
said resolver means and said motor being coupled with the numerical control unit.

13. A machine tool according to claim 10, and further comprising
a direct-current motor coupled to said rotary device, and
an encoder means coupled to said rotary device,
said encoder means and said motor being coupled with the numerical control unit.

14. A machine tool according to claim 10, and further comprising
an electromagnetic brake coupled to said rotary device for controlling the rotational position thereof.

15. A machine tool according to claim 10, and further including
a threaded rotating rod coupled to said rotary device,
a lead nut threaded on the inside and threaded on the rotating rod,
and end-of-stroke switch coupled to said lead nut, and
adjustable cams positioned to be engaged by said switch for the presetting of the maximum stroke of the tool.

16. A machine tool according to claim 15, wherein
said end-of-stroke switch is electrically connected to at least one connector leading to the numerical control unit.

* * * * *